United States Patent
Hiroki

(10) Patent No.: US 6,795,379 B2
(45) Date of Patent: Sep. 21, 2004

(54) MAGNETO-OPTICAL MEDIUM UTILIZING DOMAIN WALL DISPLACEMENT AND PROCESS OF REPRODUCTION

(75) Inventor: Tomoyuki Hiroki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 479 days.

(21) Appl. No.: 10/029,843

(22) Filed: Dec. 31, 2001

(65) Prior Publication Data

US 2002/0089898 A1 Jul. 11, 2002

(30) Foreign Application Priority Data

Jan. 9, 2001 (JP) ........................................ 2001-001543

(51) Int. Cl.$^7$ .............................................. G11B 11/00
(52) U.S. Cl. .............................. 369/13.08; 369/13.47; 369/13.52
(58) Field of Search ........................... 369/13.06, 13.08, 369/13.47, 13.52, 13.48, 13.53, 13.54, 275.2, 13.46, 13.38, 13.09, 13.35, 13.4; 428/694 ML, 694 EC, 694 MM, 64.3

(56) References Cited

U.S. PATENT DOCUMENTS

| | | | |
|---|---|---|---|
| 5,790,513 A | 8/1998 | Hiroki et al. ............ | 369/275.2 |
| 5,956,296 A | * 9/1999 | Yamamoto et al. ...... | 369/13.47 |
| 6,027,825 A | 2/2000 | Shiratori et al. ..... | 428/694 ML |
| 6,125,083 A | 9/2000 | Nishimura et al. ...... | 369/13.46 |
| 6,345,016 B1 | * 2/2002 | Shiratori ................... | 369/13.54 |
| 6,421,304 B1 | * 7/2002 | Yoshimura et al. ...... | 369/13.06 |
| 6,707,767 B2 | * 3/2004 | Hiroki ...................... | 369/13.38 |

FOREIGN PATENT DOCUMENTS

| JP | 6-290496 | 10/1994 |
|---|---|---|
| JP | 7-334887 | 12/1995 |
| JP | 11-86372 | 3/1999 |

* cited by examiner

*Primary Examiner*—Ali Neyzari
(74) *Attorney, Agent, or Firm*—Fitzpatrick, Cella, Harper & Scinto

(57) ABSTRACT

A magneto-optical medium of a domain wall displacement type is provided which does not cause inward leakage of signals caused by domain wall displacement from the rear of a reproducing light spot. The magneto-optical medium comprises a domain wall displacement layer, a switching layer, and a memory layer. The switching layer has a boundary temperature higher than room temperature for transformation from a state of a perpendicular magnetization film to a state of an in-plane magnetization film.

6 Claims, 6 Drawing Sheets

MAGNETO-OPTICAL MEDIUM UTILIZING DOMAIN WALL DISPLACEMENT AND PROCESS OF REPRODUCTION

BACKGROUND OF THE INVENTION

1. Field of the Invention

The present invention relates to a magneto-optical medium for reproduction of information by utilizing domain wall displacement, and a method of reproduction of information.

2. Related Background Art

In recent years, the magneto-optical mediums are attracting attention as a rewritable high-density recording medium: the magneto-optical medium which records information in magnetic domains of a magnetic thin film utilizing thermal energy of a semiconductor laser and reads out the recorded information by utilizing a magneto-optical effect. The treatment data are becoming diversified into sounds, pictures, animations, and so forth, and the data size thereof is increasing. Therefore, higher recording density and higher recording capacity are required for the magneto-optical mediums.

Generally, the line recording density of the magneto-optical medium depends largely on the laser wavelength of the reproducing optical system and the numerical aperture of the lens NA. Since the beam waist diameter depends on the laser wavelength $\lambda$ of the reproducing optical system and the numerical aperture NA of the lens, the spatial frequency of the signal-reproducing recording pits is limited to about $2NA/\lambda$. Therefore, for realizing the high density of a conventional optical disk, the laser wavelength of the reproducing optical system should be shortened, or the numerical aperture of the objective lens should be increased. However, the shortening of the laser wavelength is difficult because of the efficiency and heat generation of the element. The increase of the numerical aperture of the objective lens causes the problem that the lens and the disk are brought extremely close, causing collision or a like mechanical problem.

To solve such problems, super-resolution techniques are being developed in which the recording density is increased by improvement of the constitution of the recording medium or by improvement of the reproduction process without changing the laser wavelength or the numerical aperture of the objective lens. For example, Japanese Patent Application Laid-Open No. 7-334887 discloses a super-resolution system in which a lamination structure is formed from a memory layer for memorizing recorded information, a reproducing layer for masking a part of a reproducing light spot area, and an intermediate layer for controlling the exchange coupling between the above layers: the recorded information is transferred to the reproducing layer by utilizing only a part of the reproducing light spot by the temperature distribution caused by irradiation of the reproducing light spot in the recording medium to reproduce the fine magnetic domain.

In the above system, a portion of the reproducing light spot is masked and the temperature gradient is utilized. In other words, the resolution power is raised by restricting the aperture for reading the recorded pitches to a smaller region substantially. Therefore, the masked portion of the light is ineffective, decreasing the amplitude of the reproduction signals. Since the light projected to the masked portion does not contribute for producing the information signals, the smaller aperture for higher resolution will decrease the effective light to lower the signal level disadvantageously.

For utilizing effectively the reproducing light without causing the above problems, Japanese Patent Application Laid-Open No. 6-290496 discloses a reproducing method in which a domain wall displacement layer having a lower domain wall coercivity is provided on the reproduction light-introducing side and the domain in the domain wall displacement layer is displaced toward a high temperature side by utilizing the temperature gradient in the reproducing light spot to enlarge and reproduce the domain within the spot. According to this reproduction method, even if the recorded mark (magnetic domain) is small, the signal is reproduced with enlargement of the domain to utilize effectively the reproducing light to raise the resolution power without decreasing the reproducing signal amplitude.

The reproduction process disclosed in the above Japanese Patent Application Laid-Open No. 6-290496 is explained in detail by reference to drawings.

FIGS. 6A to 6C are drawings for explanation of construction of the magneto-optical recording medium and the principle of information reproduction disclosed in the above Patent Laid-Open publication. FIG. 6A is a schematic cross-sectional view illustrating the constitution of the magneto-optical recording medium and the magnetization state of the portion irradiated by a reproducing light. FIG. 6B is a graph showing a temperature distribution in the magneto-optical recording medium on irradiation of the reproducing light beam. FIG. 6C is a graph showing the distribution of the domain wall energy density $\sigma$ of the domain wall displacement layer corresponding to the temperature distribution shown in FIG. 6B.

As shown in FIG. 6A, this magneto-optical recording medium has a recording layer constituted of magnetic layer 111 as a domain wall displacement layer, magnetic layer 112 as a switching layer, and a magnetic layer 113 as a recording layer, laminated successively. In this recording medium, magnetic layer 111 is formed on the side of introduction of the reproducing light beam. Arrows 114 indicate orientation of atomic spins in the layers. Magnetic walls 115 are formed at the interface of the regions where the orientation of the atomic spins are reversed. The signal waveform in the lower part of FIG. 6A shows the recorded signals corresponding to the magnetization state of this recording layer.

Arrow 118 indicates the direction of movement of the recording medium. With the movement of the recording layer in the direction of arrow 118, light beam spot 116 is moved relatively along the information track of the recording layer. At the portion irradiated with this light beam spot 116, the temperature distribution is caused such that the temperature rises from before the front of the light spot and the temperature peak is formed behind the light spot. In this example, the medium temperature T reaches the temperature Ts near the Curie temperature of magnetic layer 112 at the position Xs.

In magnetic layer 111, the domain wall energy density $\sigma$ distributes as shown in FIG. 6C in such a manner that the energy density is minimum near the point of temperature peak behind the light beam spot 116 and is higher before the light beam spot. The gradient of the domain wall energy density $\sigma$ along the position X direction causes exertion of the force F, shown by the equation below, to the domain walls at the position X in each of the layers.

$$F = \partial \sigma / \partial X \qquad (1)$$

This force F acts on the domain walls to move toward the lower domain wall energy side. Since magnetic layer 111 has a lower domain-wall coercivity and a higher domain-wall mobility, domain walls 115 are driven readily by this force F in this layer. However, in the region before position Xs in the front of the light spot, the medium temperature is lower than Ts, which prevents movement of domain wall 115 and fixes it at the position corresponding to the domain wall in magnetic layer 113 having a higher coercivity.

With tyis magneto-optical medium, with movement of domain walls 115 in the movement direction 118, the temperature of the portion of domain wall 115 of the medium rises to reach the temperature Ts near the Curie temperature of magnetic layer 112 at the position Xs. Thereby the exchange coupling between magnetic layer 111 and magnetic layer 113 is canceled. Consequently, domain wall 115 of magnetic layer 111 is driven instantaneously to the region of a higher temperature and a lower domain wall energy density. In FIG. 6A, this movement direction is shown by dotted arrow 117. After passage of domain walls 115 through under light beam spot 116, the atomic spins of magnetic layer 111 within the light spot are oriented in one and the same direction.

Every moment when domain wall 115 reaches position Xs with the movement of the medium, domain wall 115 is displaced instantaneously to cause orientation of the atomic spin in one and the same direction under the spot. As the results, the amplitude of the reproduction signals is maximized invariably. Thereby, the problems of waveform interference or the like caused by an optical diffraction limit are completely solved.

FIGS. 7A to 7H show the relation between the spot position and the reproduced signal in the information reproduction by the aforementioned domain wall displacement. For comparison, FIGS. 8A to 8H show the relation between the light spot position and the reproduced signal in the information reproduction without the aforementioned domain wall displacement. FIGS. 7A to 7G show the states of movement of reproducing light spot 131 on information tracks 136 having magnetic domains 133 formed which have various record mark lengths. FIG. 7H and FIG. 8H show the waveforms of the derived reproduced signals.

In the case where the domain wall displacement is not caused, the maximum amplitude of the reproduced signals can be obtained only when the reproducing light spot 131 fits entirely to one domain of information track 136 (see FIG. 8H). With the domains 133 smaller than the spot diameter, a part of reproducing spot 131, not entire thereof is introduced to the magnetic domain (see FIGS. 8C to 8G) to result in unclear reproducing signals (see FIG. 8H).

On the other hand, in the case where the domain wall is displaceable, reproducing spot 131 is moved in the reproducing spot movement direction 132, which allows the temperature profile to move in the same direction as shown in FIGS. 7A to 7G. The temperature is distributed in reproducing spot 131 such that the medium reaches the critical temperature Ts of magnetic layer 112 as shown in FIGS. 6A to 6C at the portion immediately before the spot in the spot movement direction. According to the above-described principle of the domain wall displacement, the temperature of the part of the domain wall 134 is raised to the critical temperature Ts directly before the reproducing spot 131 reaches domain wall 134, and domain wall 134 is displaced in the direction 135 of domain wall displacement, which direction is reverse to the direction 132 of the reproducing spot movement. As the result, the reproducing spot 131 enters the record mark (see FIG. 7B) to give instantaneously the maximum amplitude of the reproduction signal (see FIG. 7H). Furthermore, the domain walls are displaced successively in the domain wall displacement direction 135 with close approach of the reproducing spot 131 to the domain wall of the record mark (FIGS. 7C to 7G), which produces sharp reproduction signals (see FIG. 7H).

The above reproduction process of Japanese Patent application Laid-Open No. 6-290496 involves the problems below.

For obtaining the temperature gradient for domain wall displacement only by heating with the reproducing light beam, the peak of the temperature distribution will be formed within the reproducing light spot area. For example, as shown in FIG. 6B, the temperature rises from before the front of the light spot and the temperature peak is formed in the rear portion of the light spot relative to the beam movement direction. In this state, the domain wall displacement occurs not only before the front of the reproducing light spot but at the rear portion of the reproducing light spot. Thus the both domain wall displacements are read out by the reproducing light spot, not giving satisfactory reproduction signals, disadvantageously. This Patent Laid-Open Publication describes a provision of a means for obtaining a desired temperature distribution separately from the reproducing light beam. Although this means can prevent the domain wall displacement from the rear portion of the reproduction light spot to some extent, the means for the desired temperature distribution complicates the reproduction system.

For solving the above problem of the domain wall displacement from behind the reproduction light spot, Japanese Patent Application Laid-Open No. 11-86372 discloses a method for suppressing the displacement behind the spot by application of a regeneration magnetic field. However, the required reproducing magnetic field-generating means also complicates the reproduction system.

SUMMARY OF THE INVENTION

The present invention intends to provide a magneto-optical recording medium and an information reproduction process which enables high density signal reproduction surpassing the resolving power of an optical system, and provides also an information reproduction method employing the magneto-optical recording medium.

The magneto-optical medium of domain wall displacement type of the present invention comprises:

a domain wall displacement layer in which a domain wall is displaceable;

a memory layer which stores recorded domains in accordance with information; and a switching layer which is provided between the domain wall displacement layer and the memory layer, having a Curie temperature lower than Curie temperatures of the domain wall displacement layer and the memory layer, and having a boundary temperature higher than room temperature for transformation from a perpendicular magnetization film to an in-plane magnetization film.

The reproduction process of the present invention comprises the steps of:

causing a prescribed temperature distribution having a temperature range higher than Curie temperature of the switching layer on the magneto-optical medium;

canceling exchange coupling between the domain wall displacement layer and the memory layer in a temperature range higher than the Curie temperature of the switching layer, and displacing a domain wall formed in the domain wall displacement layer to a high-temperature side by a temperature gradient of the temperature distribution;

keeping the switching layer in a state of an in-plane magnetization film, in a course of cooling of the switching layer below the Curie temperature, in a region where the orientation of magnetization of a transition metal sublattice of the domain wall displacement layer and the orientation of magnetization of a transition metal sublattice of the memory layer are reversed, while the medium temperature in the region falls from the Curie temperature to the prescribed temperature higher than room temperature; and transforming the switching layer in the region to a state of a perpendicular magnetization film at a temperature below the prescribed temperature.

DETAILED DESCRIPTION OF THE PREFERRED EMBODIMENTS

Figure 1A:
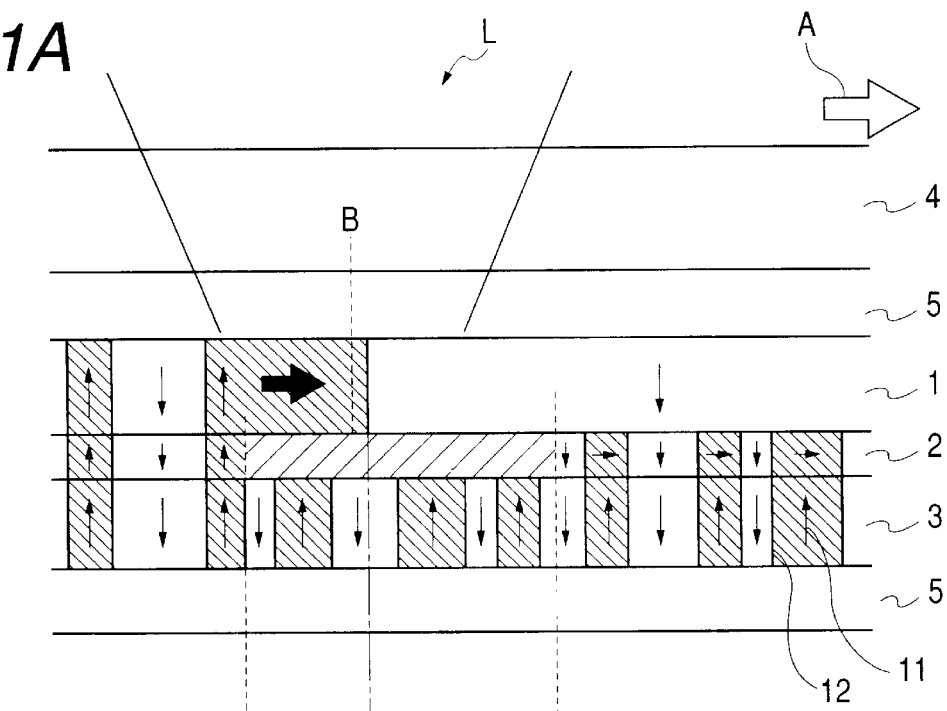
FIG. 1A is a schematic sectional view showing the constitution of the magneto-optical recording medium of the present invention, and a change of magnetization state of the recording medium by projection of reproducing light beam.

The domain wall displacement in the rear of the reproducing light spot mentioned above is caused by re-transfer of the magnetic domains in the third magnetic layer (memory layer) onto the first magnetic layer (domain wall displacement layer) to form domains in the first magnetic layer. Therefore, the domain wall displacement in the rear of the reproducing light spot can be prevented by preventing the domain formation by this re-transfer. In the present invention, the second magnetic layer (switching layer) has a prescribed boundary temperature for transformation from perpendicular magnetization film to the in-plane magnetization film. The film becomes an in-plane magnetization film in the temperature range from the above prescribed boundary temperature to the Curie temperature, whereby the re-transfer for domain wall formation is prevented. This effect is explained specifically below.

In the above constitution of the present invention, the second magnetic layer is kept in a state of an in-plane magnetization film behind the reproducing light spot in the temperature range from the Curie temperature of the second magnetic layer to the prescribed boundary temperature. Here the energy relations of the magnetic layers is considered in the range in which the second magnetic layer becomes an in-plane magnetization film. This will be explained later in detail. For causing re-transfer of the magnetic domain from the third magnetic layer to the first magnetic layer, the total of the exchange coupling energy between the second magnetic layer and the third magnetic layer, the effective perpendicular magnetic anisotropy energy of the second magnetic layer itself, the interfacial domain wall energy between the second magnetic layer and the first magnetic layer should be larger than the coercive energy of the first magnetic layer. In the region in which the second magnetic layer is transformed to the in-plane magnetized film, the effective perpendicular magnetic anisotropy energy becomes lower to decrease the total energy correspondingly. As the result, the total energy becomes smaller than the coercivity energy of the first magnetic field, which prevents the transfer of the magnetic domain from the third magnetic layer to the first magnetic layer.

In the rear of the reproducing light spot where the temperature decreases from the Curie temperature of the second magnetic layer to the prescribed boundary temperature, the second magnetic layer is kept to be a perpendicular magnetization film, not transformed to an in-plane magnetization film, owing to the exchange coupling force at the interface of the first magnetic layer and the third magnetic layer at the portion in which the magnetic domains are oriented in the same direction (the portion in which the transition metal sublattices have the same magnetization orientation; hereinafter the same). In short, the second magnetic layer is in the state of an in-plane magnetization film only in the portion where the domains of the first magnetic layer and the domains of the third magnetic layer are oriented reversely to each other.

The aforementioned portion of the in-plane magnetization film comes to be transformed into perpendicular magnetization film at the moment when the temperature of the medium becomes lower than the prescribed boundary temperature. The magnetization direction is the same as that of the magnetic domain of the third magnetic layer owing to the exchange coupling power at the interface between the second magnetic field and the third magnetic field (stronger than the exchange coupling force at the interface between the first magnetic layer and the second magnetic layer). Thereby, the magnetic domains in the third magnetic layer is re-transferred entirely to the first magnetic layer to be ready for the subsequent information reproduction.

The embodiment of the present invention is explained by reference to drawings.

Figure 1B:
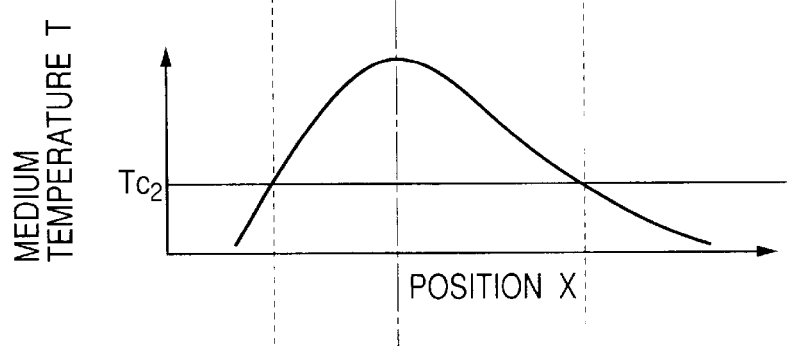
FIG. 1B shows the temperature distribution caused in the magneto-optical recording medium by projection of the reproducing light beam.
Figure 1C:
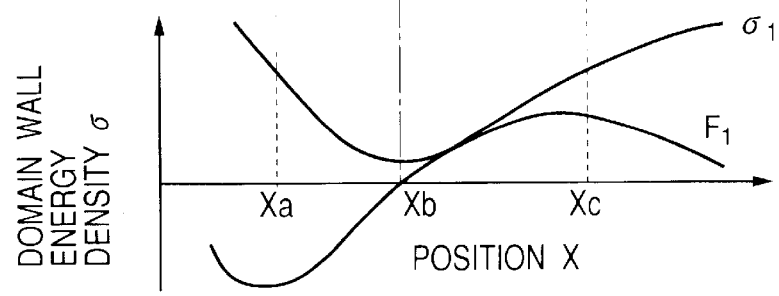
FIG. 1C shows the distribution of domain wall energy density σ of the domain wall displacement layer corresponding to the temperature distribution of FIG. 1B.

FIGS. 1A to 1C are drawings for explaining a magneto-optical recording medium of an embodiment of the present invention, and a principle of the information reproduction thereof. FIG. 1A is a schematic sectional view showing the constitution of the magneto-optical recording medium of the present invention, and a change of magnetization state of the recording medium by projection of reproducing light beam.

FIG. 1B is a graph showing the temperature distribution caused in the magneto-optical recording medium by projection of the reproducing light beam. FIG. 1C is a graph showing the distribution of domain wall energy density σ of the domain wall displacement layer corresponding to the temperature distribution of FIG. 1B.

The magneto-optical medium shown in FIG. 1A has a fundamental constitution, comprising interference layer 5, domain wall displacement layer 1, switching layer 2, memory layer 3, and protection layer 6 laminated successively on substrate 4. Reproducing light L is projected from the side of substrate 4 to form a reproducing spot on the surface of domain wall displacement layer 1. The recording medium is moved in the arrow-A direction, whereby the reproducing light spot moves relatively along the information track.

Domain wall displacement layer 1, switching layer 2, and memory layer 3 are composed respectively of a magnetic material. Arrows 11 for the respective magnetic layers indicate orientation (magnetization direction of the transition metal sublattice, hereinafter the same) of recording magnetic domain held in the layers. Bloch domain walls 12 exist between the interfaces where the adjacent magnetization is not parallel. Substrate 4 is usually made of glass, polycarbonate, or the like. The above layers can be formed by coating by continuous sputtering, by a magnetron sputtering system, or continuous vapor deposition.

Interference layer 5 is provided to increase the magneto-optical effect, being made from a transparent dielectric material such as $Si_3N_4$, AlN, $SiO_2$, ZnS, and $MgF_2$. Protection layer 6 is provided to protect the magnetic layers, being made from a material similar to that employed for interference layer 5. For optimizing the thermal structure of the entire recording medium, a metal layer may be formed additionally on protection layer 6, from a metal material such as Al, AlTa, AlTi, AlCr, and Cu, if necessary, although not shown in FIG. 1A. The layers of interference layer 5, protection layer 6, and an optionally provided metal layer are not essential to the present invention, so that the detailed explanation therefor is omitted here.

Memory layer 3 is formed from a material of high perpendicular magnetic anisotropy for stable retention of fine recording pits, the material including rare earth-iron group element noncrystalline alloy such as TbFeCo, DyFeCo, and TbDyFeCo. This memory layer 3 stores the recorded information by upward or downward orientation of the magnetic domain.

Switching layer 2 is formed from a rare earth-iron group amorphous alloy such as GdCo, GdFeCo, GdFe, GdFeCoAl, TbDyFeCoAl, and TbFeAl. This switching layer 2 becomes a perpendicular magnetization film, forming exchange coupling with memory layer 3, at room temperature, and is transformed from the perpendicular magnetization film to an in-plane magnetization film at a transition temperature $Tth_2$ between room temperature and a Curie temperature $Tc_2$.

Domain wall displacement layer 1 is composed of a rare earth-iron group amorphous alloy having a low perpendicular magnetic anisotropy such as GdCo, GdFeCo, GdFe, and NdGdFeCo; or a bubble memory material such as garnet.

The thicknesses of the layers are as follows: interference layer 5, 60 to 100 nm; domain wall displacement layer 1, 20 to 40 nm; switching layer 2, 5 to 20 nm; memory layer 3, 40 to 100 nm; and protection layer 6, 40 to 80 nm.

In addition to the above constitution, a metal layer of Al, AlTa, AlTi, AlCr, Cu or the like may be provided to adjust the thermal properties. A protection coating layer may be formed from a high polymer resin. In other constitution, substrates having respectively the layers may be bonded together.

Next, the reproduction operation by use of the magneto-optical recording medium of this embodiment is explained.

FIG. 1B shows a temperature distribution in a track center irradiated with laser light (reproduction light) with movement of the magneto-optical recording medium toward the right side in the drawing (arrow-A direction). In this temperature profile, the temperature reaches the maximum at a point a little behind the center B (right side in FIG. 1A) of the reproduction light spot depending on the linear speed of the recording medium (disk). The temperature T of the medium reaches the Curie temperature $Tc_2$ of switching layer 2 at the point Xa placed a little backward from the front end (foremost position of the relative movement) of the reproducing light spot. In the backward region from the position Xa, the temperature of the medium is higher than the Curie temperature $Tc_2$.

The domain wall energy density $\sigma_1$ of domain wall displacement layer 1 is distributed with gradient along the position X (movement direction of the reproduction light spot) corresponding to the aforementioned temperature distribution as shown in FIG. 1B. The gradient reaches the minimum around the peak of the temperature distribution as shown in FIG. 1C. The gradient of the domain wall energy density σ along the position X exerts a force F1 shown by the equation (1) shown above on the magnetic domains in the respective layers. This force F1 acts on the domain walls to move toward the region of a lower domain wall energy (higher temperature region). Domain wall displacement layer 1 has a lower domain wall coercivity (coercivity of the domain wall between the border of the adjacent magnetic domains in the layer) than that of the memory layer, and has a higher domain wall mobility. Therefore, in an isolated state of the domain wall displacement layer (not exchange-coupled with other magnetic layers 2, 3), the domain walls can readily be displaced by this force F1.

In the magneto-optical recording medium of this embodiment, the information reproduction is conducted as below by utilizing the enlargement of the magnetic domain by the above phenomenon.

In the region before the position Xa (left side in FIG. 1A), the temperature of the medium is below the Curie temperature $Tc_2$ of switching layer 2, so that the respective magnetic layers 1, 2, 3 are in a state of a perpendicular magnetization film. In this region, domain wall displacement layer 1 is exchange-coupled through switching layer 2 with memory layer 3 having a higher domain wall coercivity, and the magnetic domains are similarly oriented. The respective magnetic layers 1,2,3 have domain walls (Bloch domain walls) 12 between adjacent magnetic domains, domain walls 12 being fixed respectively at the positions corresponding to the positions of the domain walls of memory layer 3.

In the region where the temperature T of the medium is not lower than the Curie temperature $Tc_2$, the magnetization of switching layer disappears, canceling the exchange coupling between domain wall displacement layer 1 and memory layer 3. In this non-exchange coupled region, magnetic domain 12 in domain wall displacement layer 1 is displaced toward the higher temperature side by the force F1 produced by the temperature gradient and applied to the domain walls. Since the speed of this displacement is sufficiently higher than the speed of the movement of the recording medium (disk), the magnetic domain is made larger thereby than the magnetic domain recorded in memory layer 3 in the reproducing light spot area.

The information reproduction operation described above is nearly similar to the reproduction operation disclosed in Japanese Patent Application Laid-Open no. 6-290496. In this embodiment, inward leakage of unnecessary signals is prevented which may be caused by the domain wall displacement from the rear side of the light spot.

Figure 2A:
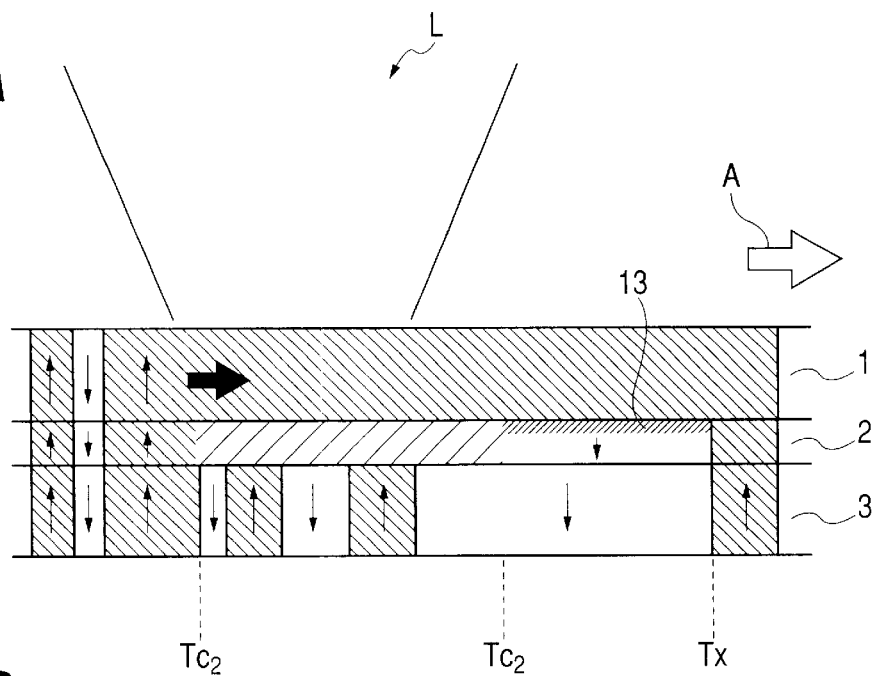
FIG. 2A is a schematic drawing of interface domain wall formed between the domain wall displacement layer and the switching layer.

The inward leakage of unnecessary signals is explained specifically which is accompanied by the domain wall displacement. In the case where switching layer 2 is not constituted to be transformable from the perpendicular magnetization film to an in-plane magnetization film in the construction in FIG. 1A, the magnetic layers 1, 2, 3 behave in the rear side of the reproducing light spot as explained below. In the rear side of the reproducing light spot, where the temperature of the medium becomes lower and the temperature of switching layer 2 becomes lower than the Curie temperature $Tc_2$ (position Xc in FIGS. 1A to 1C), an interface domain wall is formed at the interface between domain wall displacement layer 1 and memory layer 3 in the portion where the orientation of the magnetization is reversed between memory layer 3 and domain wall displacement layer 1. FIG. 2A illustrates schematically an interface domain wall formed between domain wall displacement layer 1 and switching layer 2. In this example, the temperature of the medium reaches the Curie temperature $Tc_2$ of switching layer 2 a little behind the front edge of the reproducing light spot (position Xa in FIGS. 1A to 1C), and the temperature of the medium becomes lower than the Curie temperature $Tc_2$ of switching layer 2 behind the reproducing light spot (position Xb in FIGS. 1A to 1C). In the rear portion after the position Xb, interface domain wall 13 is formed between switching layer 2 and domain wall displacement layer 1.

Figure 2B:
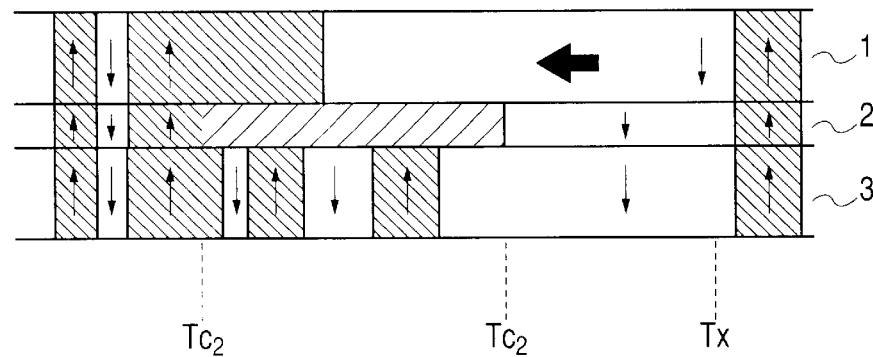
FIG. 2B is a schematic drawing showing magnetic wall displacement from the rear side of the reproducing light spot.

In the region where the temperature of the medium becomes further lower to the temperature Tx to increase the interface wall energy to be higher than the coercive energy of domain wall displacement layer 1, the magnetic domain is re-transferred from memory layer 3 to domain wall displacement layer 1 and simultaneously the Bloch domain wall is displaced toward the higher temperature side as shown in FIG. 2B. This is the displacement of the domain wall from the rear side of reproducing light spot. In the temperature distribution caused by the reproducing light spot on the recording medium, the maximum temperature is attained at a position a little behind the center of the spot. The domain wall is displaced from the rear of the spot to enter the interior of the spot, so that the reproduction signal accompanied therewith is synthesized with the reproduction signal accompanied by the domain wall displacement from the front of the spot, which prevents precise signal reproduction.

Figure 3:
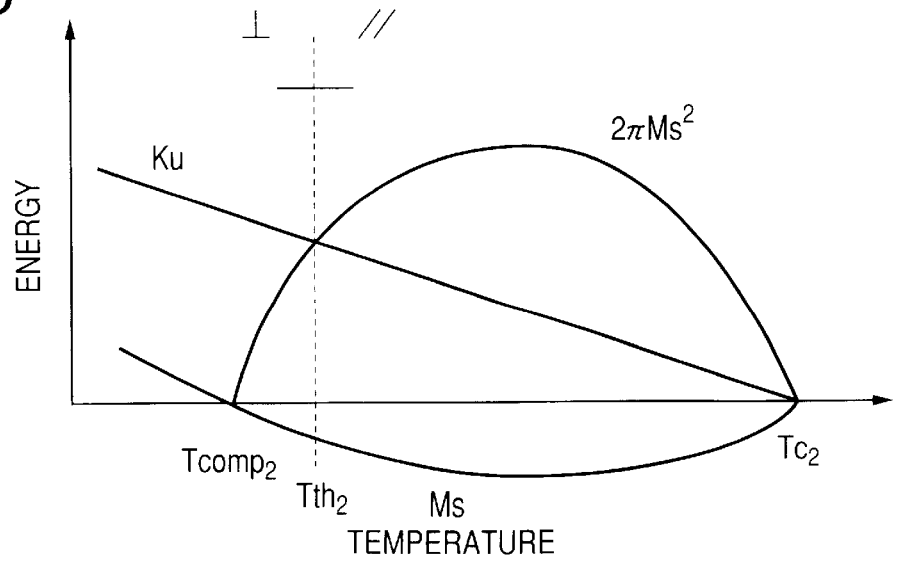
FIG. 3 is shows dependence of energy of the switching layer of FIGS. 1A, 1B and 1C on temperature.

On the other hand, in this embodiment, switching layer 2 is constituted to prevent the aforementioned domain wall displacement from the rear side of the reproducing light spot. FIG. 3 shows the characteristic temperature dependence of the energy of the switching layer. In FIG. 3, the ordinate indicates the energy, and the abscissa indicates the temperature. FIG. 3 shows the characteristic transformation between the perpendicular magnetization film and the in-plane magnetization film at the boundary temperature $Tth_2$. The constitution of switching layer 2 is specifically explained by reference to FIG. 3.

Generally, the main orientation of the magnetization is known to depend on the effective perpendicular magnetic anisotropy constant $K\perp$ defined by Equation (2) below:

$$K\perp = Ku - 2\pi Ms^2 \quad (2)$$

where Ms indicates saturation magnetization, and Ku is perpendicular magnetic anisotropy constant. A perpendicular magnetization film is formed at the positive value of $K\perp$, whereas an in-plant magnetization film is formed at the negative value of $K\perp$. Here, "$2\pi Ms^2$" signifies diamagnetization energy.

The magnitude relation between "Ku" and "$2\pi Ms^2$" can be reversed at a temperature between room temperature and Curie temperature $Tc_2$ by selecting the material and composition of switching layer 2 to give a compensation temperature near room temperature and a relatively low perpendicular magnetic anisotropy energy. At a temperature lower than a prescribed temperature $Tth_2$ ($0 < Tth_2 < Tc_2$), $$Ku > 2\pi Ms^2, K\perp > 0 \quad (3)$$

thereby switching layer 2 becoming a perpendicular magnetization film, whereas at a temperature higher than $Tth_2$, $$Ku < 2\pi Ms^2, K\perp < 0 \quad (4)$$

thereby switching layer 2 becoming an in-plane magnetization film.

Switching layer 2, which is held between domain wall displacement layer 1 constituted of a perpendicular magnetization film and memory layer 3, has apparently a higher "Ku" owing to the exchange coupling force from the perpendicular magnetization layers. Therefore, the switching layer 2 is not always transformed at the temperature $Tth_2$ as the boundary temperature from a perpendicular magnetization film to an in-plant magnetization film. For example, in FIG. 1A, when the orientation of magnetization (magnetization of transition metal sublattice) of memory layer 3 and domain wall displacement layer 1 is in the same direction behind the reproducing light spot, the magnetization of the switching layer 2 is perpendicular even at a temperature higher than $Tth_2$, owing to action of the exchange coupling forces of the two layers oriented in the same direction. In this state, the energetical relation is represented by In equality (5):

$$2\pi Ms_2^2 < Ku + \sigma_{12}/(4h_2) + \sigma_{23}/(4h_2) \quad (5)$$

where $Ms_2$ indicates saturation magnetization of switching layer 2, $h_2$ indicates a thickness of switching layer 2, $\sigma_{12}$, and $\sigma_{23}$ indicate respectively an interface domain wall energy per unit area between switching layer 2 and domain wall displacement layer 1 and between switching layer 2 and memory layer 3 when switching layer 2 is an in-plane magnetization film. Strictly, magnetostatic forces are exerted to switching layer 2 by domain wall displacement layer 1 and memory layer 3. However, in signal reproduction utilizing magnetic domain wall displacement, the magnetostatic bonding force acting on switching layer 2 may be neglected since the saturation magnetization is set at a lower level not to prevent the domain wall displacement caused by a floating magnetic field around a temperature $Tc_2$.

In the case where the above Inequality (5) is not satisfied, the re-transfer of the magnetic domains behind the reproducing light spot is prevented, since switching layer 2 becomes an in-plane magnetization film regardless of the orientation direction of domain wall displacement layer 1 and memory layer 3. In this case, however, switching layer 2 becomes an in-plane magnetization film also in front side of the reproducing light spot. Thereby, the domain transfer becomes instable immediately before the domain wall displacement to deteriorate the signal quality such as increase of jitter of reproduced signals.

On the other hand, in FIG. 1A, when the orientation of magnetization of domain wall displacement layer 1 and that of memory layer are reverse to each other behind the reproducing light spot, the switching layer 2 is magnetized to be in-plane at a temperature $Tth_2'$ or higher ($Tc_2 > Tth_2' > Tth_2$) by satisfying the condition of Inequality (6):

$$EC_1 > Ku - 2\pi Ms_2^2 + \sigma_{23}/(4h_2) + \sigma_{12}/(2Ms_1h_1) \quad (6)$$

where $EC_1$ indicates coercivity energy of domain wall displacement layer 1, $\sigma_{23}/(4h_2)$ indicates exchange coupling energy at the interface between memory layer 3 and switching layer 2, $Ku - 2\pi Ms_2^2$ indicates effective perpendicular magnetic anisotropic energy of switching layer 2, and $\sigma_{12}/(2Ms_1h_1)$ indicates interfacial domain wall energy between magnetic displacement layer 1 and switching layer 2.

At a temperature lower than $Tth_2'$, the switching layer 2 is magnetized to be perpendicular by satisfying the condition of Inequality (7):

$$EC_1 < Ku - 2\pi Ms_2^2 + \sigma_{23}/(4h_2) + \sigma_{12}/(2Ms_1h_1) \quad (7)$$

whereby the magnetic domains are re-transferred to domain wall displacement layer 1.

Based on the above reasons, the layer composition is selected to satisfy the above relations (5), (6), and (7) to prevent the re-transfer of the magnetic domains behind the reproducing light spot without converting switching layer 2 to an in-plane magnetization film in the front portion of the reproducing light spot. Thereby, the inward leakage of signals by domain wall displacement from the rear side of the reproducing light spot is prevented and signals can be reproduced steadily.

In the magneto-optical medium of this embodiment as explained above, in the case where the magnetization orientation directions of memory layer 3 and domain wall displacement layer 1 are reverse to each other, switching layer 2 is constituted to become an in-plane magnetization film in a wide temperature range from a slightly higher temperature than room temperature to the Curie temperature $Tc_2$. Before projection of the laser light, since the recording medium is at room temperature, domain wall displacement layer 1, switching layer 2, and memory layer 3 are exchange-coupled to each other, and the magnetic domains are transferred to domain wall displacement layer 1. On temperature rise of the recording medium by laser light projection up to the Curie temperature $Tc_2$, switching layer 2 is demagnetized. Thereby, the exchange coupling between memory layer 3 and domain wall displacement layer 1 is canceled, and the domain walls are displaced as described above.

When the medium is cooled below the Curie temperature $Tc_2$, an in-plane magnetization film is formed in the portion of switching layer 2 where the magnetization orientation directions is reverse to each other. In this region, no re-transfer of the magnetic domain is caused from memory layer 3 to domain wall displacement layer 1. Thus, the domain wall displacement from the rear side of the reproducing light spot is prevented.

The portions of the in-plane magnetization layer is transformed to be in a state of perpendicular magnetization film when the temperature of the medium becomes lower than the boundary temperature. Thereby the domains are re-transferred from memory layer 3 to domain wall displacement layer 1. Thus all of the magnetic domains in memory layer 3 are re-transferred to domain wall displacement layer 1 to be ready for subsequent information reproduction.

According to the magneto-optical medium of this embodiment, the magnetic domain near the Curie temperature $Tc_2$ at the front end of the reproducing laser light beam can be reproduced with enlargement into the laser spot area, and an inward leakage of signals caused by the domain wall displacement from the rear side of the laser spot is prevented. Therefore, reproduction signals can be obtained with sufficient amplitude independently of the diffraction limit of the optical system even at a high recording density.

The operation of recording of data signals onto the magneto-optical medium of this embodiment is explained briefly below.

The recording of data signals are conducted by projecting laser light having a power to raise the temperature of memory layer 3 to the Curie temperature $Tc_3$ along a track with modulation of the outside magnetic field in accordance with the data signal to be recorded with the recording medium moved. Otherwise, the laser power is modulated in accordance with the data signal to be recorded with application of a magnetic field of constant direction. In the latter case, a recorded magnetic domains smaller than the light spot size can be formed by adjusting the intensity of the laser light to raise the medium temperature to the Curie temperature at a prescribed region in the light spot, which enables recording of data signals at intervals less than optical diffraction limit.

Figure 4:
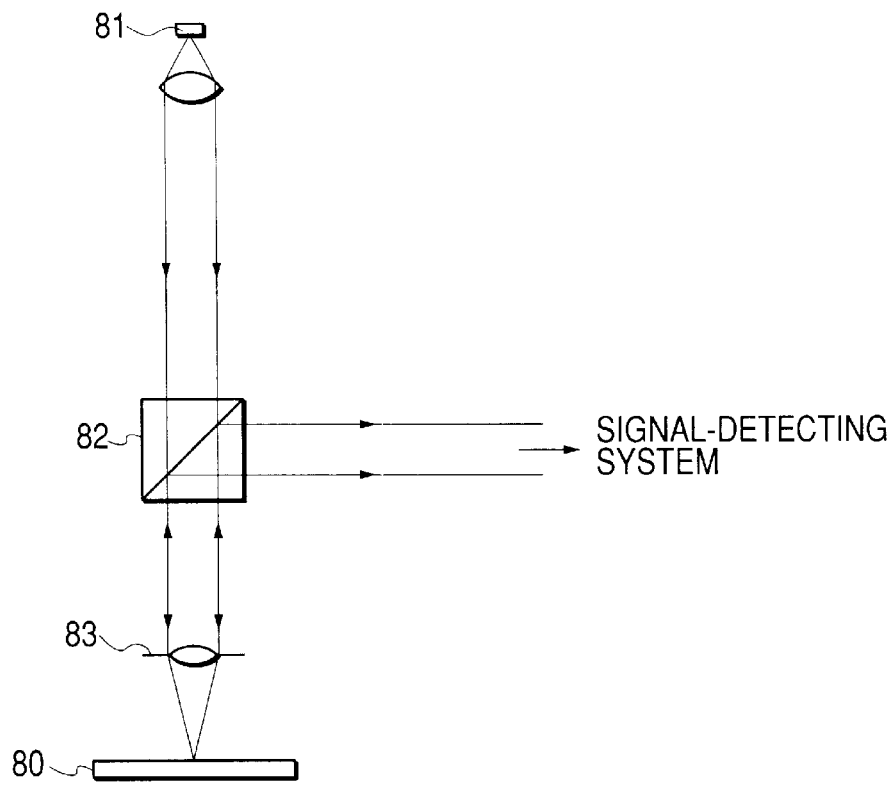
FIG. 4 shows an example of the optical system of a recording-reproducing apparatus which records and reproduces data onto or from the magneto-optical recording medium shown in FIGS. 1A, 1B and 1C.

FIG. 4 illustrates an optical system of a recording-reproducing apparatus capable of recording and reproducing data onto a magneto-optical medium shown in FIG. 1. This recording-reproducing apparatus has a known optical system of optical disk recording-reproducing apparatus, comprising laser light source 81, polarizing beam splitter 82, and objective lens 83. Laser light source 81 for recording and reproduction emits the light of a wavelength of 680 nm.

Polarizing beam splitter 82, and objective lens 83 are placed in this order in the travelling direction of the laser light emitted from laser light source 81. Polarizing beam splitter 82 is designed to transmit 70 to 80% of the P-polarized light component of the introduced light, and reflects 100% of S-polarized light component of the laser light emitted from laser light source 81. Objective lens 83 is counterposed to magneto-optical medium 80 having the structure shown in FIG. 1A. The laser light emitted from laser beam light source 81 is focused by this objective lens 85 on the recording face of recording medium 80. In data reproduction, the projected laser light heats the recording medium to cause temperature gradient as shown in FIG. 1B. The reflected light from the magneto-optical medium is reflected by beam splitter 82 and is detected by a photodetector not shown in the drawing.

EXAMPLE 1

In a conventional DC magnetron sputtering apparatus, targets composed respectively of B-doped Si, Gd, Tb, Fe, Co, and Al were set, and a polycarbonate substrate (land-groove substrate) having tracking-guide grooves formed preliminarily was fixed to a substrate holder. The chamber of the apparatus was evacuated to a vacuum of $1 \times 10^{-5}$ Pa or a higher vacuum by a cryopump. By keeping the vacuum, gaseous Ar is introduced into the chamber to a pressure of 0.5 Pa, and the layers were formed by sputtering the targets on the rotating substrate by the procedure described below. For formation of SiN layer, gaseous $N_2$ was introduced in addition to the gaseous Ar, and the layer was formed by DC reaction sputtering.

An SiN layer was formed firstly in a thickness of 90 nm as the underlayer. Then, were formed successively a $Gd_{27}Fe_{60}Co_{10}Al_3$ layer of 30 nm thick as the domain wall displacement layer, a $Gd_{21}Fe_{71}Al_8$ of 10 nm thick as the switching layer, and a $Tb_{22}Fe_{58}Co_{20}$ of 80 nm thick as a memory layer. Finally, an SiN layer of 50 nm thick was formed as the protection layer.

The composition ratios of the respective magnetic layers were controlled by ratio of the powers applied to targets of Gd, Tb, Fe, Co, and Al. The domain wall displacement layer was formed to have a Curie temperature ($Tc_1$) of 270° C., the switching layer was formed to have a Curie temperature ($Tc_2$) of about 130° C. and a compensation temperature ($Tcomp_2$) of 40° C., and the memory layer was formed to have a Curie temperature ($Tc_3$) of about 290° C.

The perpendicular magnetization film or in-plane magnetization film can be confirmed by introducing a linear polarized laser light beam as the detection light beam and measuring the rotation (Ker rotation angle θK) of polarization plane on reflection corresponding to the direction of the magnetic field. A single switching layer was measured for a residual Ker rotation angle θK at zero magnetic field with temperature rise. As the result, the residual Ker rotation angle was observed in the temperature range from room temperature to 80° C., which shows formation of a perpendicular magnetization film. At the temperature higher than 80° C., the layer was confirmed to be an in-plane magnetization film.

The magneto-optical medium (disk) of this example was used for recording and reproduction of information by rotation at a linear speed of 5 m/s by projection of a laser light beam of wavelength of 680 nm and by application of an external magnetic field. At record mark length (magnetic domain length) of 0.10 μm, the C/N ratio (an SN ratio measured in 30 kHz band width having the center at the recording frequency) was 43 dB. At recording mark length enlarged to 1.0 μm, no inward leakage of signals caused by domain wall displacement from the rear side of the laser spot was observed.

Incidentally, either the land, or groove may be used as the information track. In this example, for smoothening the domain wall displacement, the domain wall displacement layer on the groove was annealed by high-power laser prior to the information recording-reproduction. Thereby, the exchange coupling was intercepted between the information tracks on the domain wall displacement layer, so that the displacement of the domain walls was smoothened owing to absence of domain wall on the lateral side of the recording magnetic domain along the information track.

EXAMPLE 2

Figure 5:
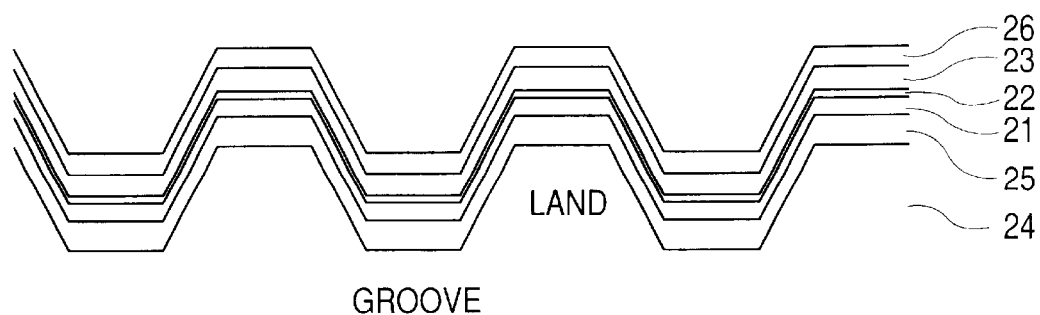
FIG. 5 is a partial sectional view of the magneto-optical medium of an example of the present invention.
Figure 6A:
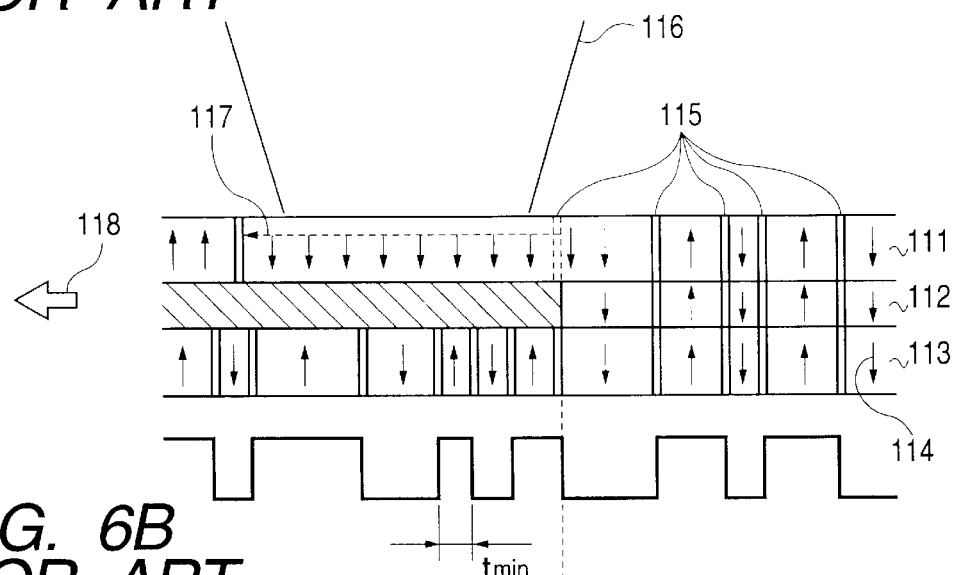
FIGS. 6A, 6B and 6C are drawings for explaining prior art techniques.
Figure 6B:
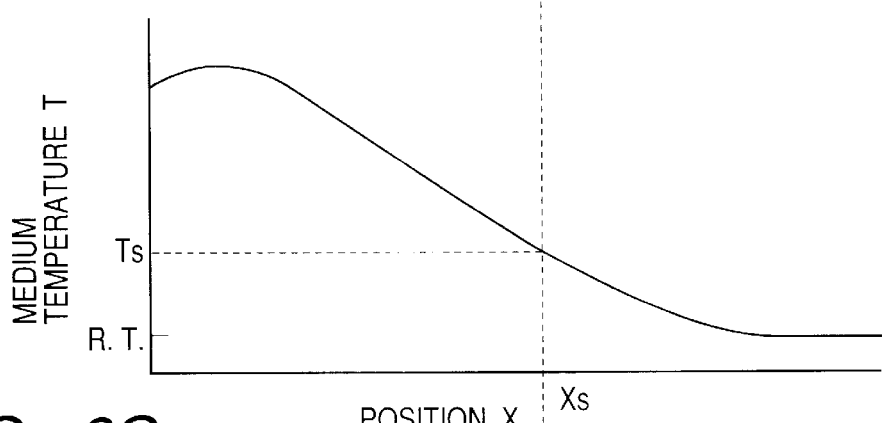
Figure 6C:
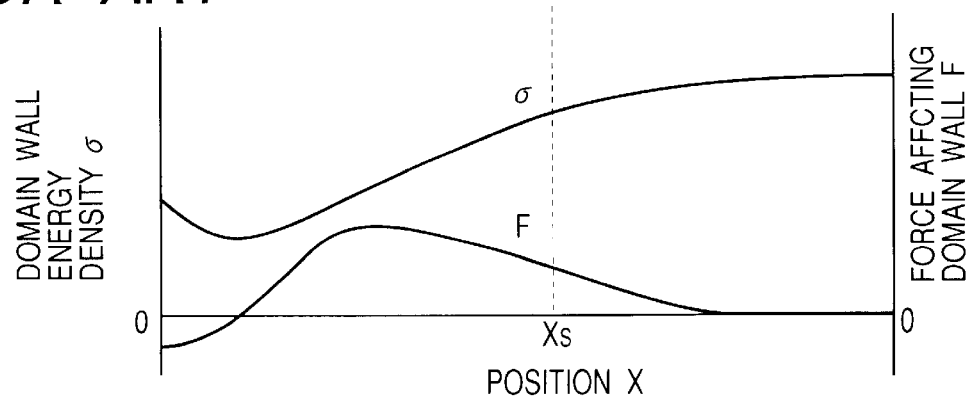
Figure 7A:
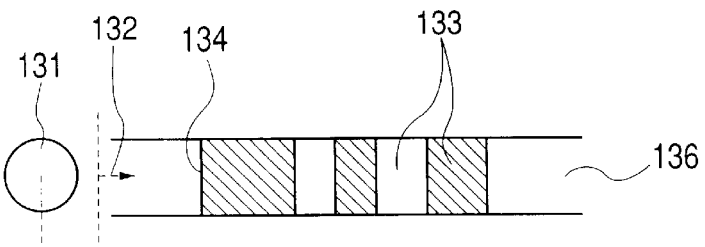
FIGS. 7A, 7B, 7C, 7D, 7E, 7F, 7G and 7H show schematically relation between the spot position and the reproduction signals in a conventional information reproduction process utilizing the domain wall displacement.
Figure 7B:
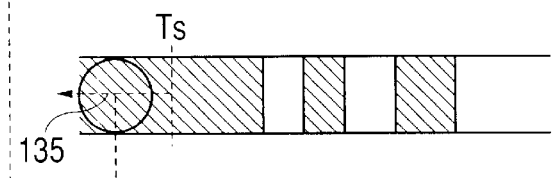
Figure 7C:
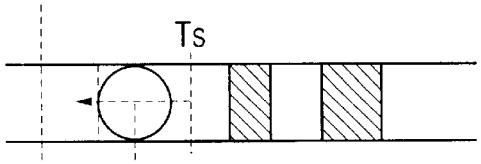
Figure 7D:
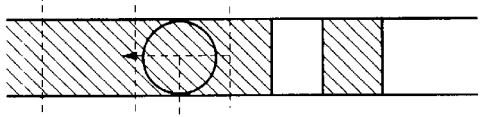
Figure 7E:
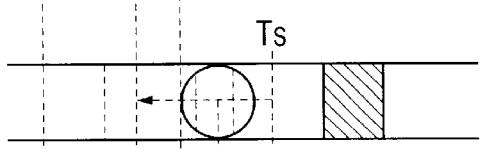
Figure 7F:
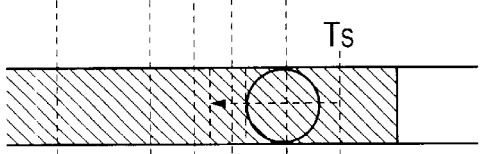
Figure 7G:
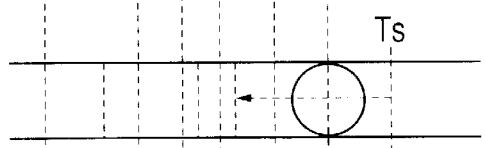
Figure 7H:
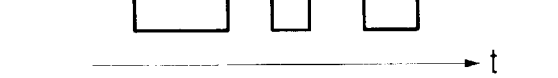
Figure 8A:
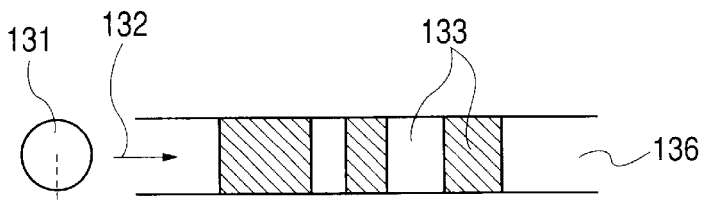
FIGS. 8A, 8B, 8C, 8D, 8E, 8F, 8G and 8H show schematically relation between the spot position and the reproduction signals in a conventional information reproduction process which does not utilize the domain wall displacement.
Figure 8B:
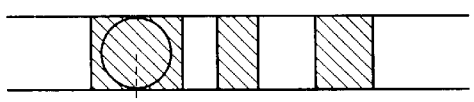
Figure 8C:
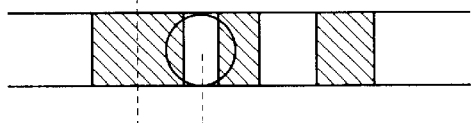
Figure 8D:
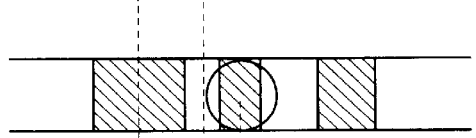
Figure 8E:
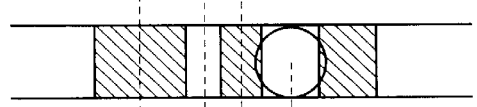
Figure 8F:
Figure 8G:
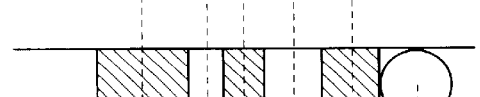
Figure 8H:
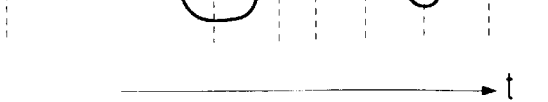

On a substrate having a large land/groove level difference, the same layers as in Example 1 were formed in lamination in the same manner as in Example 1. FIG. 5 is a partial sectional view of the magneto-optical medium of this Example. Substrate 24 had rectangular guiding grooves of a depth of 180 nm which formed the land-groove structure. On this substrate 24, were formed successively interference layer 25, domain wall displacement layer 21, switching layer 22, memory layer 23, and protection layer 26. Strictly, in this Example, although films were formed slightly on the land/groove level difference portion (taper portion), the thickness was very small on that portion in comparison with that of the land/groove portion, so that the magnetic coupling in the level difference portion is negligible. With this constitution, the tracks could be magnetically isolated simultaneously on film formation by designing the land/groove level difference larger, and the annealing conducted in Example 1 by high-output laser could be omitted.

Information recording-reproduction operation was conducted on the magneto-optical medium having the above constitution under the same conditions as in Example 1. Thereby, similar reproduction signals were obtained as in Example 1. In this Example, data could be recorded both on the land and on the groove, whereby the recording density in the track pitch direction could be improved in comparison with Example 1.

What is claimed is:

1. A magneto-optical medium of domain wall displacement type comprising:
   a domain wall displacement layer in which a domain wall is displaceable;
   a memory layer which stores recorded domain in accordance with information; and
   a switching layer which is provided between the domain wall displacement layer and the memory layer, having a Curie temperature lower than Curie temperatures of the domain wall displacement layer and the memory layer, and having a boundary temperature higher than room temperature for transition from a perpendicular magnetization film to an in-plane magnetization film.

2. The magneto-optical medium according to clam 1, wherein each of the layers is comprised of a rare-earth-iron group element amorphous alloy.

3. The magneto-optical medium according to clam 1, wherein plural information tracks are formed in a recording region, and the magnetic wall displacement layer is isolated magnetically between the information tracks.

4. The magneto-optical medium according to clam 1, wherein, with the switching layer magnetized in a reverse direction, the relation represented by the following inequality is satisfied:

$$EC_1 > Ku - 2\pi Ms_2^2 + \sigma_{23}/(4h_2) + \sigma_{12}/(2Ms_1 h_1)$$

where $EC_1$ indicates coercivity energy of domain wall displacement layer, $\sigma_{23}/(4h_2)$ indicates exchange coupling energy at the interface between memory layer and switching layer, $Ku - 2\pi Ms_2^2$ indicates effective perpendicular magnetic anisotropic energy of switching layer, and $\sigma_{12}/(2Ms_1 h_1)$ indicates interfacial domain wall energy between magnetic displacement layer and switching layer.

5. A process for reproducing information from a magneto-optical medium of a domain wall displacement type having a domain wall displacement layer, a switching layer, and a memory layer, which comprises the steps of:
   causing a prescribed temperature distribution having a temperature range higher than Curie temperature of the switching layer on the magneto-optical recording medium;
   canceling exchange coupling between the domain wall displacement layer and the memory layer in a temperature range higher than the Curie temperature of the switching layer, and displacing a domain wall formed in the domain wall displacement layer to a high-temperature side by a temperature gradient of the temperature distribution;
   keeping the switching layer in a state of an in-plane magnetization film, in a course of cooling of the switching layer below the Curie temperature, in a region where the orientation of magnetization of a transition metal sublattice of the domain wall displacement layer and the orientation of magnetization of a transition metal sublattice of the memory layer are reversed, while the medium temperature in the region falls from the Curie temperature to the prescribed temperature higher than room temperature; and
   transforming the switching layer in the region to a state of a perpendicular magnetization film at a temperature below the prescribed temperature.

6. The reproduction process according to claim 5, wherein the relation represented by the following inequality is satisfied at the prescribed temperature:

$$EC_1 > Ku - 2\pi Ms_2^2 + \sigma_{23}/(4h_2) + \sigma_{12}/(2Ms_1 h_1)$$

where $EC_1$ indicates coercivity energy of domain wall displacement layer, $\sigma_{23}/(4h_2)$ indicates exchange coupling energy at the interface between memory layer and switching layer, $Ku - 2\pi Ms_2^2$ indicates effective perpendicular magnetic anisotropic energy of switching layer, and $\sigma_{12}/(2Ms_1 h_1)$ indicates interfacial domain wall energy between magnetic displacement layer and switching layer.

* * * * *